United States Patent
Ferencz

(10) Patent No.: US 11,590,908 B2
(45) Date of Patent: Feb. 28, 2023

(54) VEHICLE CONTROL SYSTEM, METHOD AND COMPUTER PROGRAM FOR A VEHICLE CONTROL MULTILAYER ARCHITECTURE

(71) Applicant: Jaguar Land Rover Limited, Coventry (GB)

(72) Inventor: Akos Ferencz, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 743 days.

(21) Appl. No.: 16/480,825

(22) PCT Filed: May 18, 2018

(86) PCT No.: PCT/EP2018/063173
§ 371 (c)(1),
(2) Date: Jul. 25, 2019

(87) PCT Pub. No.: WO2018/211100
PCT Pub. Date: Nov. 22, 2018

(65) Prior Publication Data
US 2020/0369226 A1    Nov. 26, 2020

(30) Foreign Application Priority Data

May 18, 2017    (GB) ..................... 1707973

(51) Int. Cl.
*B60R 16/023* (2006.01)
*B60R 16/037* (2006.01)
(Continued)

(52) U.S. Cl.
CPC ........ *B60R 16/0232* (2013.01); *B60R 16/037* (2013.01); *G06F 9/5027* (2013.01); *H04L 67/125* (2013.01)

(58) Field of Classification Search
CPC . B60R 16/0232; B60R 16/037; G06F 9/5027; H04L 67/125
See application file for complete search history.

(56) References Cited

U.S. PATENT DOCUMENTS

| | | | |
|---|---|---|---|
| 7,162,333 B2 | 1/2007 | Koibuchi et al. | |
| 2004/0017281 A1* | 1/2004 | Dix | ........................ B60R 25/04 340/5.72 |
| 2018/0234496 A1* | 8/2018 | Ratias | ................... H04L 9/3239 |

FOREIGN PATENT DOCUMENTS

| | | | |
|---|---|---|---|
| DE | 112020001131 T5 * | 1/2022 | ............. G01S 17/10 |
| EP | 1136325 A1 | 9/2001 | |

(Continued)

OTHER PUBLICATIONS

Patents Act 1977: Combined Search and Examination Report under Sections 17 and 18(3), UKIPO Application No. GB1707973.2, dated Nov. 14, 2017, 7 pp.

(Continued)

*Primary Examiner* — Hussein Elchanti
(74) *Attorney, Agent, or Firm* — Reising Ethington P.C.

(57) ABSTRACT

A vehicle control system comprising means for implementing a vehicle control multilayer architecture, the vehicle control multilayer architecture comprising: a vehicle level feature layer; an actuator control layer configured to control a plurality of actuators; and a control layer isolating the vehicle level feature layer and the actuator control layer from each other, the control layer comprising a plurality of distinct service control channels, wherein: each of the plurality of distinct service control channels is associated with a vehicle operation; each service control channel is configured to translate vehicle level requests from the vehicle level feature layer to actuator level requests, wherein one or more actuators are assigned to the operation associated with each respective service control channel; and each service control (Continued)

channel is configured to receive vehicle level control requests from one or more vehicle level features and to provide control requests to the actuator control layer to control one or more associated actuators in response to a received vehicle level control request.

18 Claims, 10 Drawing Sheets

(51) Int. Cl.
*G06F 9/50* (2006.01)
*H04L 67/125* (2022.01)

(56) References Cited

FOREIGN PATENT DOCUMENTS

| | | |
|---|---|---|
| EP | 3285084 A2 | 2/2018 |
| WO | 2007/048003 A2 | 4/2007 |
| WO | WO-2016161132 A1 * | 10/2016 ........... B67D 7/0401 |
| WO | WO-2021249637 A1 * | 12/2021 |

OTHER PUBLICATIONS

Patents Act 1977: Combined Search and Examination Report under Sections 17 and 18(3), UKIPO Application No. GB1808111.7, dated Nov. 1, 2018, 7 pp.

International Search Report and Written Opinion of the International Searching Authority, International Application No. PCT/EP2018/063173, dated Aug. 16, 2018, 15 pp.

* cited by examiner

VEHICLE CONTROL SYSTEM, METHOD AND COMPUTER PROGRAM FOR A VEHICLE CONTROL MULTILAYER ARCHITECTURE

RELATED APPLICATIONS

This application is a 35 U.S.C. § 371 national stage application of PCT Application No. PCT/EP2018/063173, filed on May 18, 2018, which claims priority from Great Britain Patent Application No. 1707973.2, filed on May 18, 2017, the contents of which are incorporated herein by reference in their entireties. The above-referenced PCT International Application was published in the English language as International Publication No. WO 2018/211100 A1 on Nov. 22, 2018.

TECHNICAL FIELD

The present disclosure relates to a vehicle control system, method and computer program for a vehicle control multilayer architecture. In particular, but not exclusively it relates to a vehicle control system, a method and computer program for implementing and/or using a vehicle control multilayer architecture in vehicle motion control.

Aspects of the invention relate to a vehicle control system, a method, a vehicle system, a vehicle and a computer program.

BACKGROUND

Vehicles may comprise one or more vehicle level features, such as cruise control, assisted braking, assisted parking, emergency brakes and so on. The vehicle level features may monitor the status of the vehicle and make one or more vehicle level requests within a software architecture such as to change the speed and/or direction of the vehicle.

In conventional systems the software architecture that deals with such requests comprises controller(s) linked with each feature and appropriate vehicle actuators. The feature's specific controllers can control the actuators to cause the vehicle level effect requested by the particular feature.

The addition of new features and/or actuators or the changing of the features and/or actuators in such a system is difficult to implement and control.

It is an aim of the present invention to address the disadvantages of the prior art.

SUMMARY OF THE INVENTION

Aspects and embodiments of the invention provide a vehicle control system, a method, a vehicle system, a vehicle and a computer program as claimed in the appended claims.

According to an aspect of the invention, there is provided a vehicle control system for a host vehicle, the vehicle control system comprising one or more controllers, the one or more controllers being configured to provide:
a vehicle level feature layer;
an actuator control layer configured to control a plurality of actuators; and
a control layer isolating the vehicle level feature layer and the actuator control layer from each other, the control layer comprising a plurality of distinct service control channels, wherein:
each of the plurality of distinct service control channels is associated with a vehicle operation; each service control channel is configured to translate vehicle level requests from the vehicle level feature layer to actuator level requests, wherein one or more actuators are assigned to the operation associated with each respective service control channel; and
each service control channel is configured to receive vehicle level control requests from one or more vehicle level features and to provide control requests to the actuator control layer to control one or more associated actuators in response to a received vehicle level control request.

One or more of the distinct service control channels may be configured to receive feedback from the actuator control layer.

The one or more distinct service control channels configured to receive feedback from the actuator control layer may be configured to provide at least one further control request to one or more associated actuators in dependence upon the received feedback.

The control layer may comprise a return channel, distinct from the service control channels, and configured to provide feedback from the actuator control layer to at least one of the control layer and the vehicle level feature layer.

The return channel may be configured to convert sensor data from the actuator control layer into one or more vehicle level measurements.

One or more of the plurality of service control channels may be configurable in dependence upon a plurality of selectable vehicle operation types.

Configuring a service control channel in dependence upon a plurality of selectable vehicle operation types may comprise configuring control requests from the service control channel to the associated actuators in dependence upon the current vehicle operation type for the channel.

The control layer may comprise a plurality of service control channels associated with the same vehicle operation but each associated with a different vehicle operation type.

The vehicle operation types may comprise a plurality of comfort, emergency, low speed, off road, semi-autonomous and autonomous.

Each service control channel may be configured to check whether received vehicle level requests are valid requests for the service control channel.

The control layer may be configured to perform request arbitration on the valid vehicle level requests.

The service control channels may be configured to implement one or more safety protocols.

The means for implementing a vehicle control multilayer architecture may comprise an electronic processor and an electronic memory device electronically coupled to the electronic processor and having instructions stored therein to implement a vehicle control multilayer architecture as described in any preceding paragraph.

According to another aspect of the invention, there is provided a method of using a vehicle control system as claimed in any preceding paragraph, the method comprising:
receiving, at a service control channel, a vehicle level request from the vehicle level feature layer; and
providing one or more control requests to the actuator control layer to control one or more actuators associated with the service control channel.

The method may comprise receiving feedback, at the service control channel, from the actuator control layer.

The method may comprise providing at least one further control request to one or more associated actuators in dependence upon the received feedback.

The method may comprise receiving feedback, at the control layer and/or vehicle level feature layer, from the actuator control layer via a return channel of the control layer, distinct from the service control channels.

The method may comprise converting, at the return channel, sensor data from the actuator control layer into one or more vehicle level measurements.

The method may comprise configuring one or more of the plurality of service channels in dependence upon a plurality of selectable vehicle operation types.

Configuring a service control channel in dependence upon a plurality of selectable vehicle operation types may comprise configuring control requests from the service control channel to the associated actuators in dependence upon the current vehicle operation type for the channel.

The control layer may comprise a plurality of service control channels associated with the same vehicle operation but each associated with a different vehicle operation type.

The vehicle operation types may comprise a plurality of comfort, emergency, low speed, off road, semi-autonomous and autonomous.

The method may comprise checking, at the service control channel, whether the received vehicle level request is a valid request for the service control channel.

The method may comprise performing request arbitration on the valid vehicle level requests.

According to yet another aspect of the invention, there is provided a method comprising using a vehicle control system as described in any preceding paragraph.

According to a further aspect of the invention, there is provided a vehicle system comprising a vehicle control system as described in any preceding paragraph.

According to a still further aspect of the invention, there is provided a vehicle comprising a vehicle control system as described in any preceding paragraph and/or a vehicle system as described in any preceding paragraph.

According to another aspect of the invention, there is provided a computer program comprising instructions that, when executed by one or more processors, cause a vehicle control system as described in any preceding paragraph to perform, at least:
  receiving, at a service control channel, a vehicle level request from the vehicle level feature layer; and
  providing one or more control requests to the actuator control layer to control one or more actuators associated with the service control channel.

According to yet another aspect of the invention, there is provided a computer program comprising instructions that, when executed by one or more processors, cause a system to perform a method as described in any preceding paragraph.

According to a further aspect of the invention, there is provided a non-transitory computer readable media comprising a computer program as described in any preceding paragraph.

According to a still further aspect of the invention, there is provided a vehicle control system comprising:
  an electronic processor; and
  an electronic memory device electrically coupled to the electronic processor and having instructions stored therein, the processor being configured to access the memory device and execute the instructions stored therein such that it is operable to implement a vehicle control multilayer architecture as described herein.

According to another aspect of the invention, there is provided a vehicle control system comprising means for implementing a vehicle control multilayer architecture, the vehicle control multilayer architecture comprising:
  a vehicle level feature layer;
  an actuator control layer configured to control a plurality of actuators; and
  a control layer isolating the vehicle level feature layer and the actuator control layer from each other, the control layer comprising a plurality of distinct service control channels associated with a vehicle operation.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Examples of the disclosure relate to a vehicle control multilayer architecture. Some examples relate to a vehicle control system for implementing the vehicle control multilayer architecture and/or a method of using the vehicle control multilayer architecture.

In examples, the vehicle control multilayer architecture comprises a vehicle level feature layer, an actuator control layer for controlling a plurality of actuators and a control layer that isolates the vehicle level feature layer and the actuator control layer from each other.

In examples, the control layer comprises a plurality of distinct service control channels each associated with a vehicle operation such as acceleration, braking and so on. One or more actuators are assigned to the operation associated with the respective service control channel.

In examples, each of the service control channels can translate vehicle level requests from the vehicle level feature layer to actuator level requests.

The actuator level requests may be provided to the associated actuator(s) as control requests to the actuator control layer to control the one or more associated actuators in response to the received request from the vehicle level feature layer.

The use of distinct service control channels in this way is advantageous and provides technical benefits. This because the service control channels are independent from each other and can be added, taken away or modified without requiring modification to the other service channels.

Furthermore, the actuators can be added or taken away without requiring modification to the vehicle level feature layer. Additionally or alternatively, vehicle level features can be added or taken away without requiring modification to the actuator control layer.

Moreover, the service control channels can be configured to check the validity of a request made to the channel and arbitration on requests can then be done using only valid requests which also simplifies this process.

Safety protocols and so on can also be configured in the distinct service control channels which allows new features and/or actuators to be added without requiring affecting the safety of the system.

Figure 1:
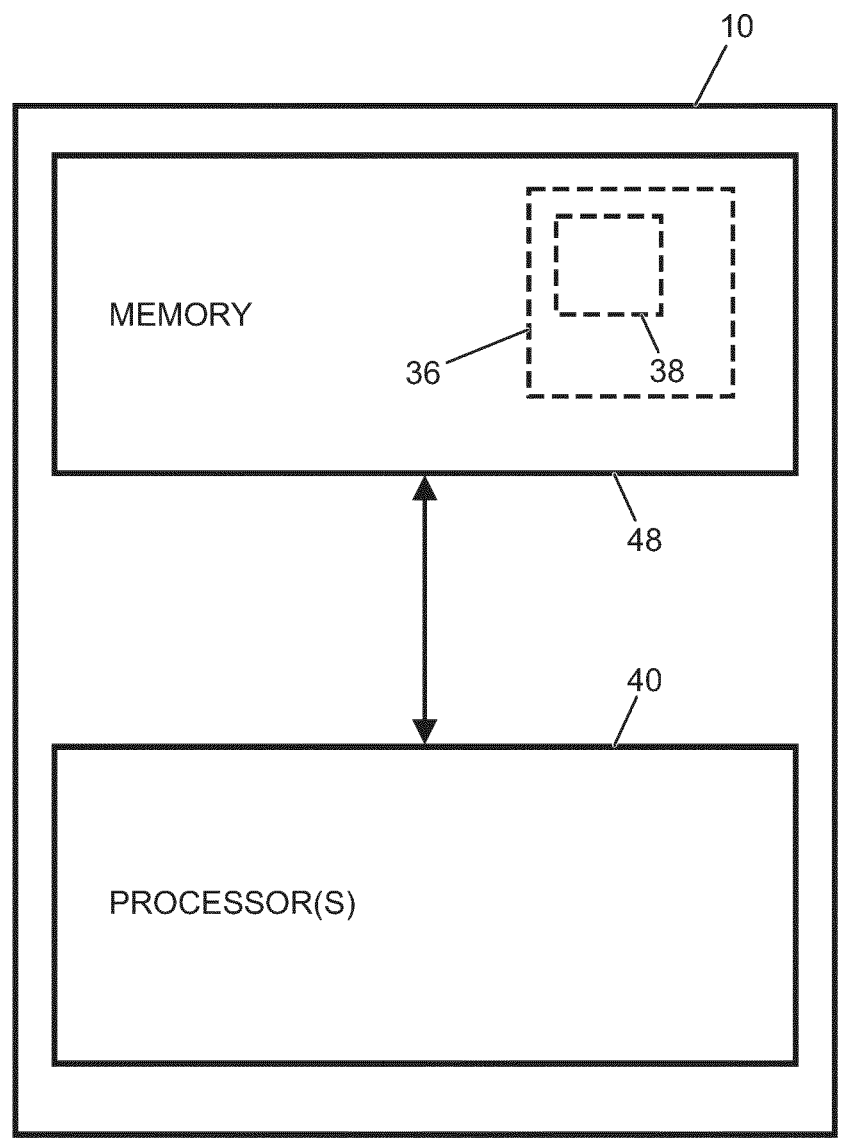
FIG. 1 illustrates an example of a vehicle control system.
Figure 1:
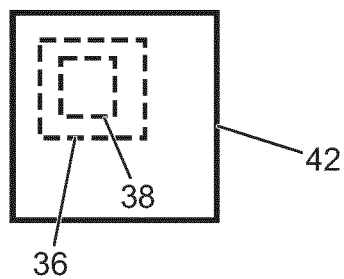
Figure 2:
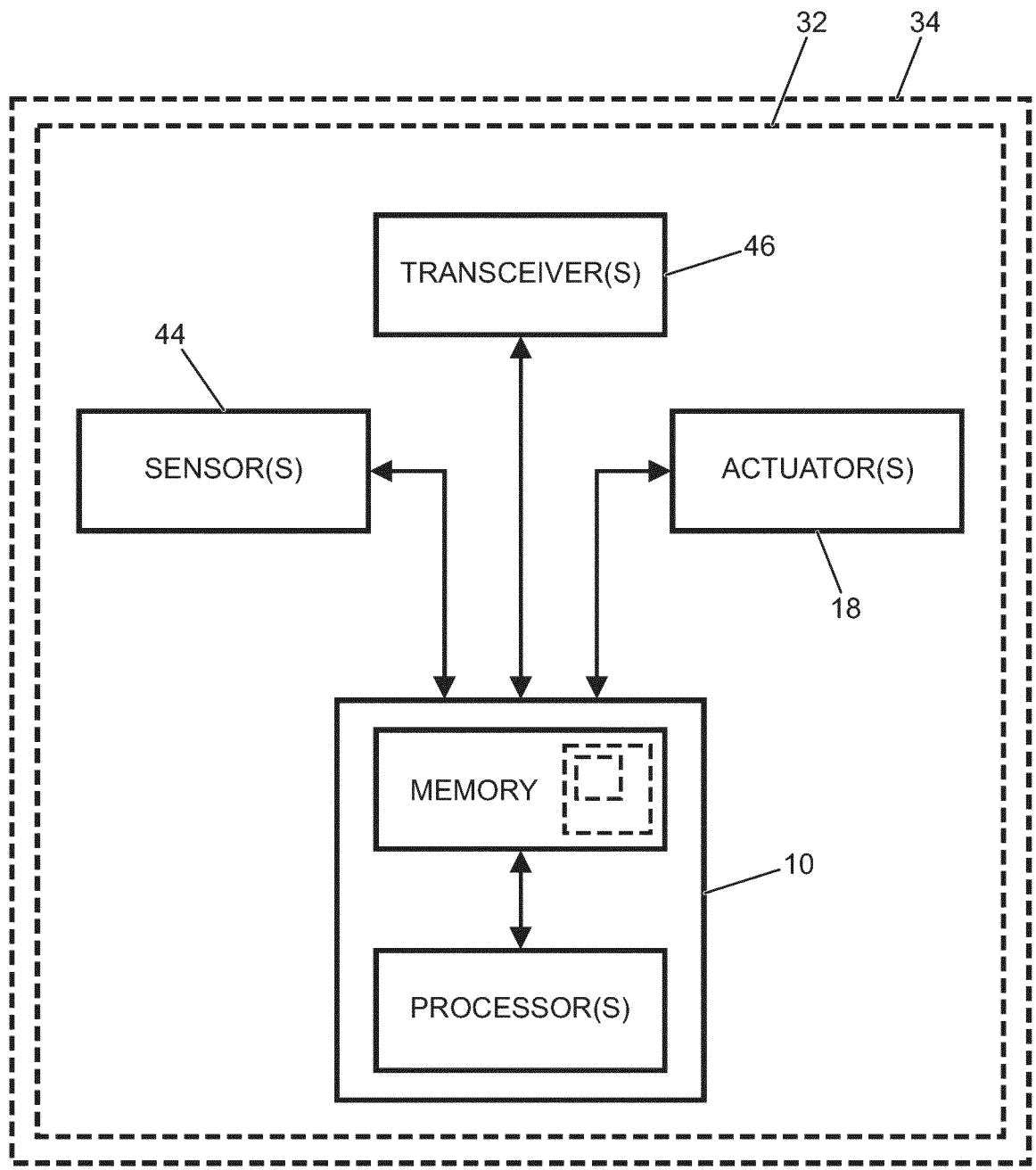
FIG. 2 illustrates an example of a vehicle system in a vehicle.

FIGS. 1 and 2 illustrate a vehicle control system 10 comprising means for implementing a vehicle control multilayer architecture 12, the vehicle control multilayer architecture 12 comprising:
  a vehicle level feature level 14;
  an actuator control layer 16 configured to control a plurality of actuators 18; and
  a control layer 20 isolating the vehicle level feature layer 14 and the actuator control layer 16 from each other, the control layer 20 comprising a plurality of distinct service control channels 22, wherein:
  each of the plurality of distinct service control channels 22 is associated with a vehicle operation;
  each service control channel 22 is configured to translate vehicle level requests 24 from the vehicle level feature layer 14 to actuator level requests 26, wherein one or more actuators 18 are assigned to the operation associated with each respective service control channel 22; and
  each service control channel 22 is configured to receive vehicle level control requests 24 from one or more vehicle level features 50 and to provide control requests 26 to the actuator control layer 16 to control one or more associated actuators 18 in response to a received vehicle level control request 24.

Figure 3:
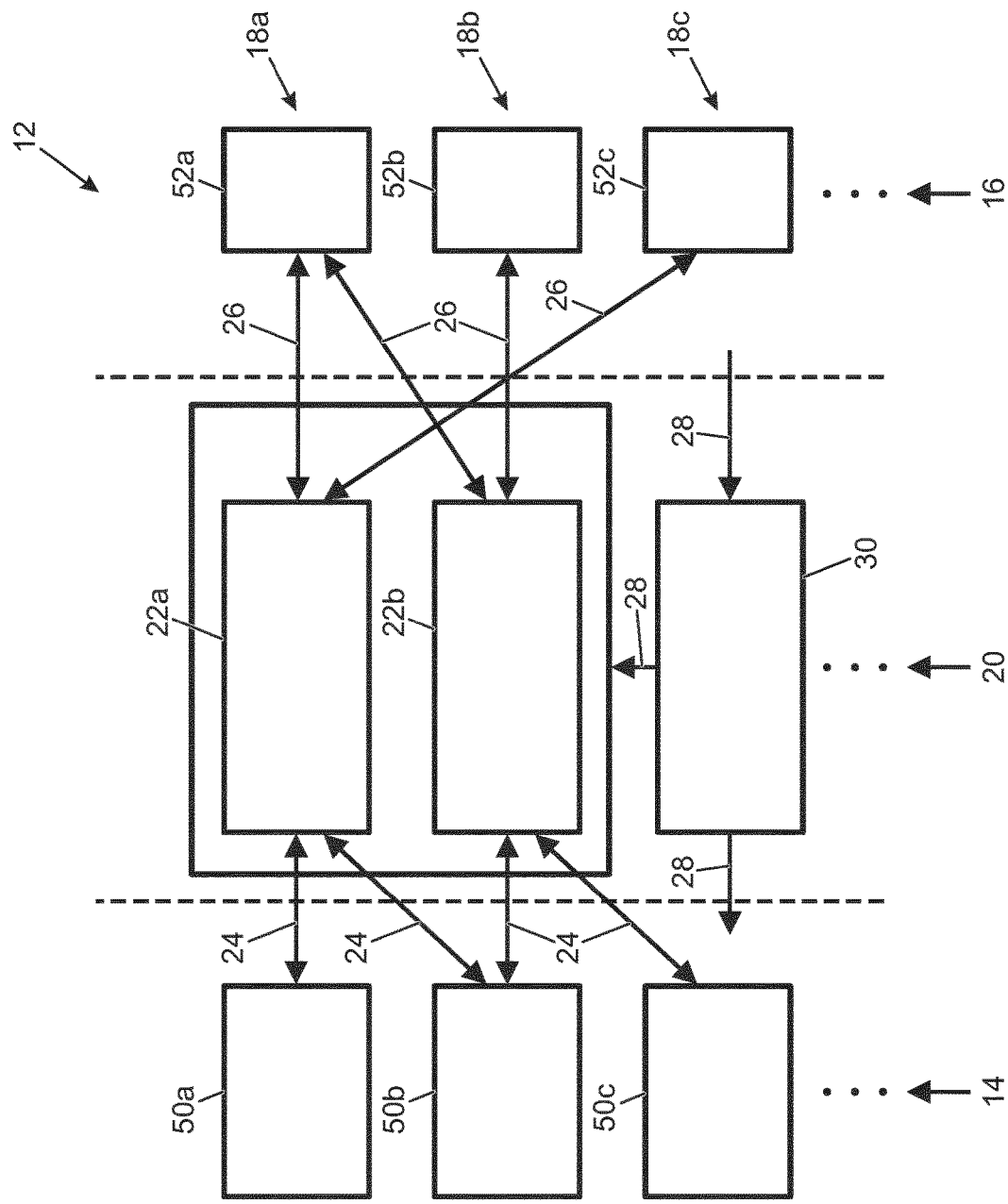
FIG. 3 illustrates an example of a vehicle control multilayer architecture.

An example of a vehicle control multilayer architecture is illustrated in FIG. 3.

Figure 4:
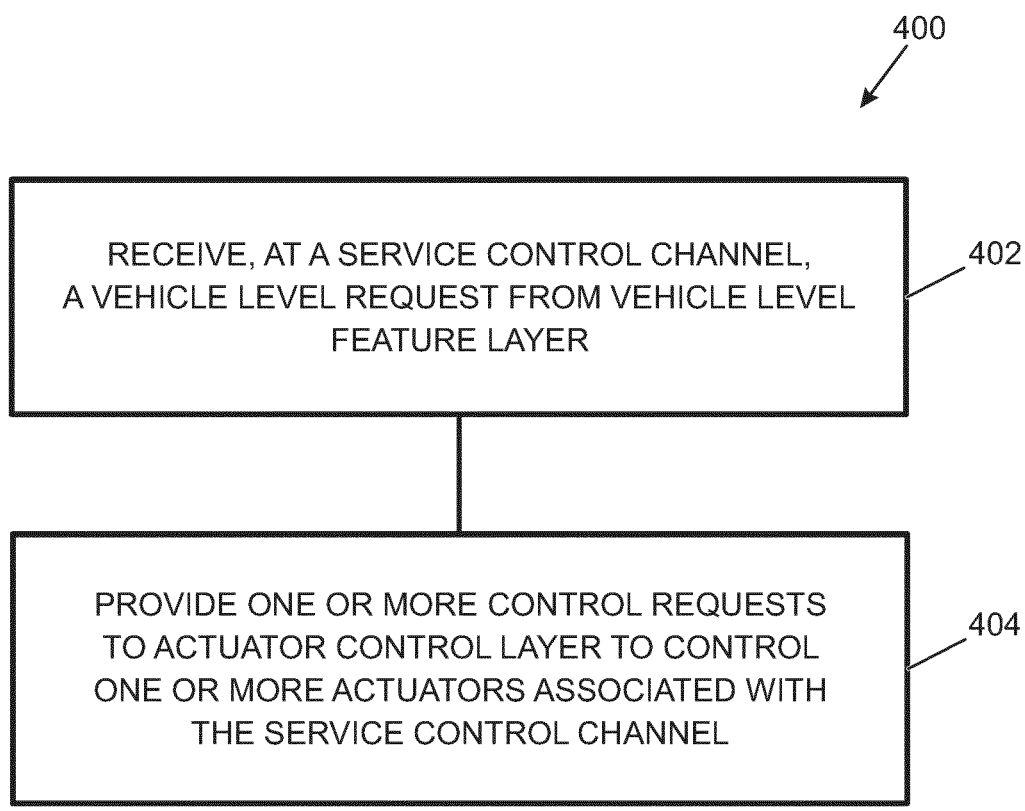
FIG. 4 illustrates an example of a method.
Figure 5:
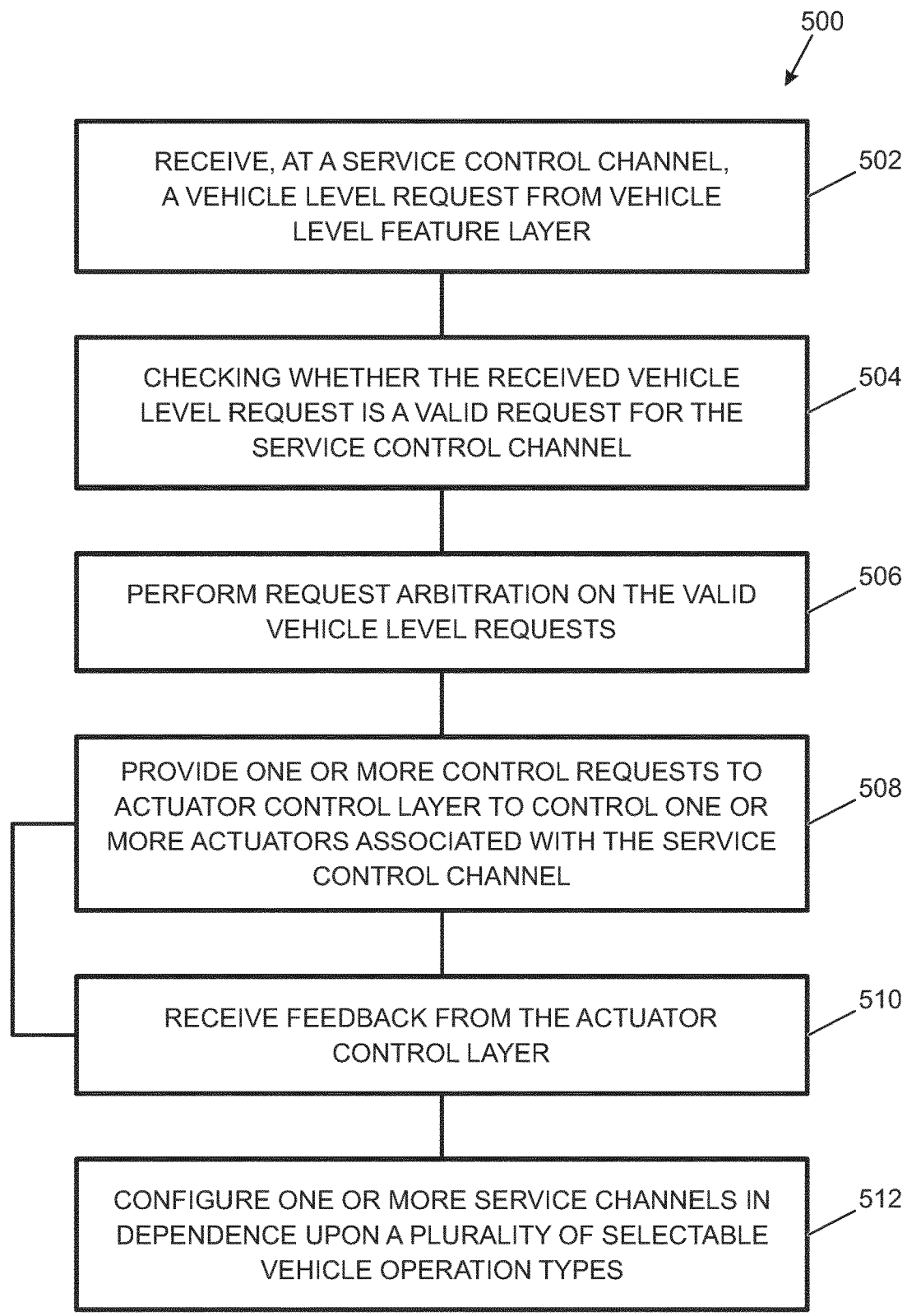
FIG. 5 illustrates an example of a method.

FIGS. 4 and 5 illustrate a method 400, 500 of using a vehicle control system 10 as described herein, the method 400, 500 comprising:
  receiving, at a service control channel 22, a vehicle level request 24 from the vehicle level feature layer 14; and
  providing one or more control requests 26 to the actuator control layer 16 to control one or more actuators 18 associated with the service control channel 22.

FIG. 1 illustrates an example of a vehicle control system 10 that may be a chip or a chipset. The vehicle control system 10 may form part of one or more vehicle systems 32 comprised in a vehicle 34, such as the one illustrated in the example of FIG. 2.

In some examples, the vehicle control system 10 may be considered a controller or controllers.

Implementation of a controller 10 may be as controller circuitry. The controller 10 may be implemented in hardware alone, have certain aspects in software including firmware alone or can be a combination of hardware and software (including firmware).

As illustrated in FIG. 1 the controller 10 may be implemented using instructions that enable hardware functionality, for example, by using executable instructions of a computer program 36 in a general-purpose or special-purpose processor 40 that may be stored on a computer readable storage medium (disk, memory etc) to be executed by such a processor 40.

The processor 40 is configured to read from and write to the memory 48. The processor 40 may also comprise an output interface via which data and/or commands are output by the processor 40 and an input interface via which data and/or commands are input to the processor 40.

The memory 48 stores a computer program 36 comprising computer program instructions (computer program code) that controls the operation of the apparatus 10 when loaded into the processor 40. The computer program instructions, of the computer program 36, provide the logic and routines that enables the apparatus to perform the methods illustrated in FIGS. 4 and 5. The processor 40 by reading the memory 48 is able to load and execute the computer program 36.

The apparatus 10 therefore comprises:
  at least one processor 40; and
  at least one memory 48 including computer program code 38 the at least one memory 48 and the computer program code configured to, with the at least one processor 40, cause the apparatus 10 at least to perform:
    a method of using a vehicle control system 10 as described herein, the method comprising:
  receiving, at a service control channel 22, a vehicle level request 24 from the vehicle level feature layer 14; and
  providing one or more control requests 26 to the actuator control layer 16 to control one or more actuators 18 associated with the service control channel 22.

As illustrated in FIG. 1, the computer program 36 may arrive at the apparatus 10 via any suitable delivery mechanism 42. The delivery mechanism 42 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 36. The delivery mechanism may be a signal configured to reliably transfer the computer program 36. The apparatus 10 may propagate or transmit the computer program 36 as a computer data signal.

Although the memory 48 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIGS. 4 and 5 may represent steps in a method and/or sections of code in the computer program 36. The illustration of a particular order to the blocks does not necessarily imply that there is a required or preferred order for the blocks and the order and arrangement of the block may be varied. Furthermore, it may be possible for some blocks to be omitted.

In examples, the vehicle control system 10 of FIG. 1 or the vehicle system 32 of FIG. 2 provide means for performing the method 400, 500 illustrated in FIGS. 4 and 5 and as described herein.

That is, in examples the vehicle control system 10 of FIG. 1 or the vehicle system 32 of FIG. 2 comprise means for implementing a vehicle control multilayer architecture 12 as described herein, such as the one illustrated in the example of FIG. 3.

The vehicle control system 10 may be considered a controller or controllers and/or a system.

FIG. 2 illustrates an example of a vehicle system 32.

FIG. 2 also illustrates a vehicle 34 comprising a vehicle control system 10 as described herein and/or a vehicle system 32 as described herein.

The vehicle system 32 illustrated in the example of FIG. 2 may be considered a control system. In some, but not necessarily all, examples the vehicle system 32 is comprised in a vehicle 34 as illustrated in the example of FIG. 2.

In the example of FIG. 2, the vehicle system 32 comprises one or more sensors 44, one or more transceivers 46, one or more actuators 18 and the vehicle control system 10 illustrated in the example of FIG. 1.

Accordingly, FIG. 2 illustrates a vehicle system 32 comprising a vehicle control system 10 as described in relation to FIG. 1.

The vehicle control system 10 provides means for controlling operation of the vehicle system 32.

As illustrated in the example of FIG. 2 the elements 44, 46 and 18 are operationally coupled to the vehicle control system 10 and any number or combination of intervening elements can exist between them (including no intervening elements).

In some examples, the elements 44, 46 and 18 may be operationally coupled to each other and/or may share one or more components. Additionally or alternatively, the elements 44, 46 and 18 may be operationally coupled to and/or share one or more components with other elements not illustrated in the example of FIG. 2.

The one or more sensors 44 are for obtaining/collecting information. In examples, one or more sensors 44 are for obtaining information in relation to a vehicle state and/or context, such as vehicle speed, acceleration, deceleration, direction change, temperature and so on, to allow vehicle level features 50 (see, for example, FIG. 3) to make vehicle level requests to carry out the various feature's operations.

The one or more sensors 44 comprise any suitable sensor(s)/means for obtaining information. In examples the one or more sensors 44 comprise one or more sensors 44 for detecting the motion state of the vehicle 34, for example, for actuator control purposes and/or comprise one or more sensors 44 for detecting a context of the vehicle 34, such as information of the surroundings of a vehicle and/or the location of the vehicle 34.

For example, the one or more sensors 44 may comprise one or more accelerometers, one or more location sensors such as GPS sensor(s), one or more temperature sensors, one or more cameras, one or more speed sensors, one or more biometric sensors, one or more optical sensors, one or more infrared sensors, one or more ultrasonic sensors, one or more radar sensors one or more chemical sensors, one or more proximity sensors, one or more wheel tick and speed sensors, one or more inertial sensors, one or more drive shaft speed sensors, one or more displacement sensors, one or more pressure sensors, one or more current sensors, one or more position switches, one or more steering torque sensors, one or more steering rack position sensors, one or more steering angle sensors, one or more damper height sensors, one or more pitch sensors, one or more roll sensors and so on.

The one or more transceivers 46 may be considered to be one or more sensors 44 as the one or more transceivers 46 may, for example, be for receiving one or more signals containing information pertinent to one or more features 50 in the vehicle level feature layer 14.

In examples, the vehicle control system 10 is for controlling operation of the one or more sensors 44. Information may be transmitted between the vehicle control system 10 and the one or more sensors 44. For example, control information may be transmitted from the vehicle control system 10 to the one or more sensors 44 and/or information gathered/collected by the one or more sensors 44 transmitted to the vehicle control system 10.

This is illustrated in the example of FIG. 2 by the double-headed arrow linking the one or more sensors 44 and the vehicle control system 10.

The one or more transceivers 46 are for receiving and/or transmitting one or more signals. In examples, the one or more transceivers 46 are for receiving and/or transmitting one or more signals to/from a vehicle 34.

In examples, any suitable transceiver or transceivers may be used and in some examples separate transmitter(s) and/or receiver(s) may be used.

In some examples, the one or more transceivers 46 are for transmitting and/or receiving signals over any suitable range. For example, the one or more transceivers 46 may be configured to receive and/or transmit radio frequency signals over any suitable range.

In some examples, the one or more transceivers 46 are configured to operate using one or more short range radio communication protocols, such as WiFi or Bluetooth protocols and/or one or more long range radio protocols such as one or more cellular telephone protocols.

In some examples, the one or more transceivers 46 are for transmitting and/or receiving signals comprising information. The signals may be transmitted and/or received using any suitable communication protocol or protocols.

In examples, the vehicle control system 10 is configured to control the one or more transceivers 46 to transmit and/or receive one or more signals to transmit and/or receive information.

In examples, the vehicle control system 10 is for controlling operation of the one or more transceivers 46. Information may be transmitted between the vehicle control system 10 and the one or more transceivers 46. For example, control information may be transmitted from the vehicle control system 10 to the one or more transceivers 46 and/or data/information received in one or more signals transmitted to the vehicle control system 10. This is illustrated in the example of FIG. 2 by the double-headed arrow linking the one or more transceivers 46 and the vehicle control system 10.

In examples, the one or more actuators 18 are for operating on the vehicle 34 to affect the status and/or context of the vehicle 34. In examples, the one or more actuators 18 are configured to change the motion state or the motion of the vehicle 34.

For example, the one or more actuators 18 may be configured to operate on the vehicle 34 to affect the speed and/or direction of the vehicle 34.

In examples, any suitable actuator(s) 18 may be used. For example, any suitable mechanical and/or electrical and/or hydraulic and/or magnetic and/or pneumatic actuator(s) 18 configured to operate on the vehicle 34 may be used.

For example, the one or more actuators 18 may comprise one or more of the following: internal combustion engine(s), electric motor(s), hydraulic brake(s), parking brake(s), regenerative brake(s), transmission(s), steering means, active damper(s) and so on.

In examples, a vehicle control system 10 is for controlling the one or more actuators 18. For example, the vehicle control system 10 is for controlling the one or more actuators 18 to control operation of the vehicle 34.

In examples, the vehicle control system 10 is for controlling operation of the one or more actuators 18. Information may be transmitted between the vehicle control system 10 and the one or more actuators 18. For example, control information may be transmitted from the vehicle control system 10 to the one or more actuators 18 and/or capability or error information transmitted to the vehicle control system 10. This is illustrated in the example of FIG. 2 by the double-headed arrow linking the one or more actuators 18 and the vehicle control system 10.

In examples, the vehicle control system 10 provides means for controlling the various elements of the vehicle system 32. In some examples, the vehicle control system 10 controls the various elements of the vehicle system 32 using one or more wired network systems and/or using one or more wireless network systems.

In the example of FIG. 2, the vehicle system 32 is comprised in a vehicle 34. The vehicle 34 may be any suitable vehicle 34 such as a car, van or truck and so on.

The vehicle system 32 may comprise any number of additional elements not illustrated in the example of FIG. 2. Additionally or alternatively, one or more of the elements of the vehicle system 32 illustrated in the example of FIG. 2 may be integrated and/or combined. For example, the one or more sensors 44 may be at least partially combined with the one or more transceivers 46.

In some examples, one or more of the elements illustrated in the example of FIG. 2 may be omitted from the vehicle system 32. For example, the one or more transceivers 46 may be omitted from the vehicle system 32.

FIG. 3 illustrates an example of a vehicle control multilayer architecture 12. In the example of FIG. 3 a logical view of the vehicle control multilayer architecture 12 is shown.

In examples, the vehicle control system 10 of FIG. 1 and/or the vehicle system 32 of FIG. 2 comprise means for implementing the vehicle control multilayer architecture 12.

In examples, the vehicle control multilayer architecture 12 comprises a vehicle level feature layer 14, a control layer 20 and an actuator control layer 16. In examples, the control layer 20 isolates the vehicle level feature layer 14 from the actuator control layer 16.

That is, in examples information, such as requests and/or feedback, cannot be transferred between the vehicle level feature layer 14 and the actuator control layer without going via the control layer 20.

In examples, the vehicle level feature layer 14 comprises one or more vehicle level features 50.

The vehicle level feature(s) 50 are automated/semi-automated features operating at the vehicle level. In examples, the vehicle level feature(s) 50 are configured to automatically or semi-automatically control operation of the vehicle 34 and/or one or more parts of the vehicle 34. In some examples, the vehicle level feature(s) 50 are configured to control operation of the vehicle 34 and/or one or more parts of the vehicle 34 in dependence upon information received from the one or more sensors 44 and/or one or more transceivers 46 of FIG. 2.

In examples, the one or more vehicle level features 50 are configured to control the vehicle states and/or make decisions about the vehicle state changes in relation to the surroundings of the vehicle 34.

In some examples, the vehicle level feature(s) 50 are configured to control the speed and/or direction of the vehicle 34.

In examples, the vehicle level feature layer 14 may comprise any number of vehicle level feature(s) 50. In the example of FIG. 3, three vehicle level features 50*a*, 50*b*, and 50*c* are illustrated but in examples any suitable number of vehicle level features 50 may be comprised in the vehicle level feature layer 14. This is indicated by the dots present in the vehicle level feature layer 14 in the example of FIG. 3.

In examples, the vehicle level feature layer 14 comprises one or more of: driver assisting, partial autonomous, semi-autonomous, highly autonomous, fully autonomous, cruise control, speed limiter, emergency braking, lane keeping, evasive steering, semi-autonomous driving, autonomous driving, remote control driving, parking in, parking out, automated parking and so on.

Each of the vehicle level features 50 in the vehicle level feature layer 14 is configured to communicate with one or more distinct service control channels 22 in the control layer 20.

In some examples, it may be considered that each vehicle level feature 50 in the vehicle level feature layer 14 is assigned to and/or associated with one or more distinct service channels 22 in the control layer 20.

In examples, one or more, or in some examples each, vehicle level feature 50 is associated with the distinct service control channel(s) 22 to allow access by each vehicle level feature 50 to the appropriate service control channel or channels 22 for the feature 50.

In examples, one or more, or in some examples each, vehicle level feature 50 is configured to provide vehicle level requests 24 or vehicle level control requests 24 to the associated control channel(s) 22 in the control layer 20 to request a control action with regard to the vehicle 34 or one or more parts of the vehicle 34.

As can be seen in the example illustrated in FIG. 3, the vehicle level feature 50*a* is configured to provide vehicle level control requests 24 to the service control channel 22*a*, the vehicle level feature 50*b* is configured to provide vehicle level control requests 24 to the service control channels 22*a* and 22*b* and the vehicle level feature 50*c* is configured to provide vehicle level control requests 24 to the service control channel 22*b*.

In examples, information may be provide to the vehicle level feature layer 14 from the control layer 20 as indicated by the double-headed arrows linking the vehicle level features 50*a*, 50*b*, 50*c* and the service control channels 22*a*, 22*b*. For example, arbitration capability information, availability information, error information, feedback information and so on may be provided from the control layer 20, such as from the service control channels 22, to the vehicle level feature layer 14, such as the vehicle level features 50*a*, 50*b* and/or 50*c*.

The control layer 20 comprises a plurality of distinct service control channels 22, also referred to herein as "services". In some examples the control layer 20 comprises a plurality of distinct service control channels 22 and information service channels, such as return channel 30.

In examples, one or more, or in some examples each, of the plurality of distinct service control channels 22 is associated with a vehicle operation. In some examples, one or more, or in some examples each, of the plurality of distinct service control channels 22 is associated with a motion type. For example, the plurality of distinct service control channels may be associated with a vehicle motion per motion type.

In examples, any suitable vehicle operation may be associated with a service control channel 22.

For example, one or more of the following vehicle operations may be associated with a service control channel 22: acceleration, braking, coast down, hold, direction and so on.

In examples, high level maneuvering services include, but are not limited to, path maintaining, distance control, speed control, speed limit control, direction control and so on.

In examples, middle level control services include, but are not limited to, acceleration control, road wheel angle, stand still control, coast down, damper control.

In examples, low level services include, but are not limited to, engine torque, engine torque limit, brake torque or force, hydraulic brake hold, parking brake hold, transmission D/R position, transmission P/N position, steering wheel torque, steering rack position.

In examples the high, middle and low level services refer to service hierarchy. For example, a high level service may call a middle level service and a middle level service may call a low level service. In examples, any suitable number of service levels may be used.

In examples, each service control channel 22 is distinct from each other and is configured to translate vehicle level requests 24, such as vehicle level control requests 24, from the vehicle level feature layer 14 to actuator level requests 26.

That is, in examples, the control layer 20 is configured to translate vehicle level requests from the vehicle level feature layer 14 into requests that can be understood by the actuator control layer 16 to allow control of one or more actuators 18 to, for example, affect the motion of a vehicle 34.

In some examples, the service control channels 22 are configured to receive vehicle level control requests 24 from one or more vehicle level features 50 and to provide control requests 26 to the actuator control layer 16 to control one or more associated actuators 18 in response to a receive vehicle level control request 24.

For example, a longitudinal path, distance or speed request may be translated to an acceleration request that is further translated to one or more internal combustion engines, electric engines, hydraulic or electric brakes. A stand still request may be translated to hydraulic brake force, parking brake apply and/or transmission position park. A forward direction request may be translated to transmission position drive and/or electric motor positive torque. A lateral path or steering request may be translated to steering rack force and/or rack position. A coast down request may be translated to drive-line disengagement, engine torque removal and so on.

In the example of FIG. 3, two distinct service control channels 22a, 22b are illustrated. However, in examples, any suitable number or surplus control channels 22 may be present as illustrated by the dots in the control channel in FIG. 3.

In some, but not necessarily all, examples, one or more of the plurality of service control channels 22 is configurable in dependence upon a plurality of selectable vehicle operation types. In some examples, the selectable vehicle operation types may be considered motion types.

In examples, the vehicle operation types comprise one or more of comfort, emergency, low speed, off-road, semi-autonomous and autonomous.

In examples, one or more of the service control channels 22 may configure the control request provided to the associated actuators 18 in dependence upon the selected vehicle operation type.

For example, a braking service control channel 22 that is under a comfort vehicle operation type will provide actuator control request(s) 26 that may be different compared to the actuator control request(s) 26 of the channel 22 under an emergency operation type.

Similarly, for an acceleration service control channel 22 an off-road vehicle operation type may require different actuator control of the associated actuators 18 compared to a low speed operation type.

In examples, configuring a service control channel 22 in dependence upon a plurality of selectable vehicle operation types comprises configuring control requests 26 from the service control channel 22 to the associated actuators 18 in dependence upon the current vehicle operation type for the channel 22.

In some examples, the control layer 20 comprises a plurality of service control channels 22 associated with the same vehicle operation but each associated with a different vehicle operation type.

For example, the control layer 20 may comprise a first acceleration service control channel 22a and a first braking service control channel 22b associated with a comfort vehicle operation type as illustrated by the box around the subsequent control channels 22a and 22b in the example of FIG. 3. The service control channel may also comprise a second acceleration service control channel 22 and a second braking service control channel 22 associated with an emergency vehicle operation type (not illustrated in the example of FIG. 3).

In such examples, different vehicle level requests can be provided to the appropriate service control channel 22 associated with the appropriate vehicle operation type in dependence upon the requirements of the vehicle level feature 50 making a request.

Furthermore, in examples where there are a plurality of control channels 22 associated with the same vehicle operation but each associated with a different operation type the control channels 22 can be configured to check that the vehicle level requests 24 are valid for the operation type of the channel 22.

For example, an emergency braking request 24 to a comfort braking channel 22 may be blocked as invalid to that channel 22.

In examples, one or more service control channel 22, or in some examples each service control channel 22, is configured to check whether received vehicle level requests 24 are valid requests for the service control channel 22.

For example, the service control channel 22 may check whether the vehicle level request 24 is a valid request for the particular service control channel 22 and its associated vehicle operation.

Additionally or alternatively, where the service control channel 22 is associated with a vehicle operation type the service control channel 22 may check whether the vehicle level request 24 is a valid request for the vehicle operation type.

For example, a service control channel 22 may check that a requested change in vehicle motion, such as a requested deceleration of the vehicle 34, is valid for the vehicle operation type of the service control channel 22.

In examples, one or more service control channels 22, or in some examples each service control channel 22, is configured to inform the vehicle level feature 50 originating a vehicle level request 24 if the vehicle level request 24 is invalid.

In examples, one or more of the service control channels 22 are configured to perform arbitration on the received requests 24 to prioritize/order the received vehicle level control requests 24.

In examples, the control layer 20 is configured to perform request arbitration on the valid vehicle level request 24.

This is advantageous as this allows for a simplified request arbitration process to be performed. Furthermore, performing the arbitration process on requests that have checked to be valid for the service control channel 22 further simplifies the arbitration process.

In examples, one or more of the distinct service control channels 22 is configured to receive feedback 28 (see, for example, FIG. 6) from the actuator control layer 16. For example, one or more of the distinct service control channels 22 may be configured to receive feedback from the associated actuator(s) 18 via the actuator control layer 16.

In examples, any suitable type of feedback 28 may be provided. For example, feedback indicating the status of the controlled actuator(s) 18 may be provided to the service control channel 22 that originated the actuator control request 26.

Additionally or alternatively, sensor information may be fed back to the service control channel 22 to provide an indication of the effect of the actuator control request 26.

In examples, the one or more distinct service control channels 22 configured to receive feedback from the actuator control layer 16 is configured to provide at least one further control request 26 to one or more associated actuators 18 in dependence upon the received feedback 28.

For example, the service control channel(s) 22 may determine from the received feedback 28 that further control of one or more associated actuators 18 is required and may therefore provide one or more further actuator control requests 26 to one or more associated actuators 18.

This is advantageous as it allows a feedback loop to be provided between the actuator control layer 16 and the control layer 20 without involvement of the vehicle level feature layer 14.

Accordingly, this provides for a vehicle level feature 50 to make a request to one or more service control channels 22 which may then operate to fulfill the vehicle level request by controlling the associated actuator(s) to fulfill the request without further involvement of the vehicle level feature 50 or vehicle level feature layer 14.

In examples, the control layer 20 comprises a return channel 30, distinct from the service control channels 22, and configured to provide feedback from the actuator control layer 16 to at least one of the control layer 20 and the vehicle level feature layer 14.

This is illustrated in the example of FIG. 3 by the arrow pointing from the actuator control layer 16 to the return channel 30 and the subsequent arrows pointing to the vehicle level feature layer 14 and service control channels 22.

For example, feedback information from one or more actuators 18 and/or sensor data from one or more sensors 44 may be passed back to the control layer 20 and/or vehicle level feature layer 14 via the return channel 30.

In examples, the return channel 30 is configured to convert sensor data from the actuator control layer 16 into one or more vehicle level measurements.

For example, a return channel 30 may be configured to receive sensor information from one or more sensors 44 such as wheel speed sensor(s), inertial sensor(s) and drive shaft speed sensor(s) and to convert that information into vehicle level measurements such as speed over the ground, acceleration over the ground, road slope, distance over the ground and so on.

The return channel 30 may be configured to provide the feedback data 28 to control channel 20 and/or vehicle level feature layer 14 to allow the vehicle level features 50a, 50b and/or 50c to make one or more vehicle level requests in dependence upon the feedback and/or the service control channels 22a, 22b to provide further actuator control requests 26 to the actuator controller 16 in dependence upon the received feedback information.

In examples, each service control channel 22 is configured to provide actuator control requests 26 to associated actuator control blocks or modules 52 to control associated actuators 18.

In examples, the service control channels 22 may be associated with any suitable number of actuator control blocks or modules 52.

In the example of FIG. 3, the service control channel 22a is associated with the actuator control block or module 52a and 52c. The service control channel 22 is associated with the actuator control block or module 52a and 52b.

The provision of a plurality of distinct service control channels 22 is advantageous because it allows for the addition of vehicle level features 50 without reconfiguring control of the associated actuators 18.

Additionally or alternatively, it allows for a change of one or more actuators 18 without altering the vehicle level features 50.

This provides a technical benefit as it provides for a simplified implementation which provides, for example, for simpler request arbitration and safety implementation.

The actuator control layer 16 is configured to control one or more actuators 18 of the vehicle 34.

In examples, the actuator control layer 16 comprises one or more actuator control blocks or modules 52. Each actuator control block or module 52 is, in examples, configured to control one or more associated actuators 18.

Although the example of FIG. 3 illustrates three actuator control blocks or modules 52a, 52b and 52c associated with actuators 18a, 18b and 18c respectively, in examples, any suitable number of actuator control blocks or modules 52 and/or associated actuators 18 may be provided. This is indicated by the dots in the actuator control layer 16 in FIG. 3.

In examples, the actuator control blocks or modules 52 are configured to receive control requests 26 from the associated service control channels 22 and to control the associated actuator(s) 18 in dependence upon the received actuator control request 26.

For example, the service control channel 22a may be a braking control channel and may issue an actuator control request 26 to control one or more brakes of the vehicle 34. In response the actuator control block 52a may control the vehicle brakes to slow the vehicle 34.

Any suitable actuators may be used as described in relation to FIG. 2.

In examples, one or more of the actuator control blocks or modules 52 may be configured to receive feedback from the associated actuators 18 and/or one or more sensors 44. For example, the actuator control blocks or modules may be configured to receive feedback information regarding the controlled actuator(s) 18 and/or the effect on the motion of the vehicle 34.

The actuator control block(s) or module(s) 52 and/or the actuator control layer 16 may be configured to provide the feedback to the associated service control channel 22 as illustrated by the double-headed arrow between the service control channels 22 and the actuator control blocks/modules 52 in the example of FIG. 3.

Additionally or alternatively, the feedback information 28 from the actuator control layer 16 may be provided to a return channel 30 in the control layer 20.

In examples, the vehicle feature control layer 14, the control layer 20 and/or the actuator control layer 16 comprise one or more functional control blocks. In some examples the one or more functional control blocks are for providing one or more of the features of the vehicle feature control layer 14, the control layer 20 and/or the actuator control layer 16.

For example, one or more of the service control channels 22 in the control layer 20 may comprise one or more functional control blocks to implement request checking, request arbitration, request translation and so on.

FIG. 4 illustrates an example of a method 400. In examples, the method 400 is for using a vehicle control system 10 and described in relation to FIG. 1 and/or a vehicle system 32 as described in relation to FIG. 2.

In some examples, the method 400 may be considered a method for using a vehicle control multilayer architecture 12 as described in relation to FIG. 3.

In examples, the method 400 is performed by the vehicle control system 10 of FIG. 1 or the vehicle system 32 of FIG. 2.

That is, in examples, the vehicle control system 10 of FIG. 1 or the vehicle system 32 of FIG. 2 comprises means for performing the method 400.

At block 402 a vehicle level request 24 from a vehicle level feature layer 14 is received at a service control channel 22.

For example, with reference to FIG. 3 service control channel 22a may receive a vehicle level request 24 from vehicle level feature 50a in the vehicle level feature layer 14. In examples, the vehicle level request may be for a change in motion of the vehicle 34 such as for a change in speed and/or direction of the vehicle 34.

In some examples, information may be received at the vehicle level feature layer 14 from one or more sensors 44 and/or one or more transceivers 46 at the vehicle request issued to the service control channel 22 in dependence upon the received information.

At block 404 one or more control requests 26 are provided to the actuator control layer 16 to control one or more actuators 18 associated with the service control channel 22.

For example, with reference to FIG. 3 the service control channel 22a may provide one or more actuator control requests 26 to actuator control blocks or modules 52a and/or 52c to control associated actuator(s) 18a and/or 18c.

For example, the actuator control request 26 may be to control one or more braking mechanisms of the vehicle 34.

FIG. 5 illustrates an example of a method 500. In examples, the method 500 is for using a vehicle control system 10 and described in relation to FIG. 1 and/or a vehicle system 32 as described in relation to FIG. 2.

In some examples, the method 500 may be considered a method for using a vehicle control multilayer architecture 12 as described in relation to FIG. 3.

In examples, the method 500 is performed by the vehicle control system 10 of FIG. 1 or the vehicle system 32 of FIG. 2.

That is, in examples, the vehicle control system 10 of FIG. 1 or the vehicle system 32 of FIG. 2 comprise means for performing the method 500.

Block 502 is the same as block 402 described in relation to FIG. 4 and may therefore be as described in relation to FIG. 4.

At block 504 it is checked whether the received vehicle level request 24 is a valid request for the service control channel 22.

With reference to FIG. 3, the service control channel 22b may determine that a received vehicle level request 24 from vehicle level feature 50b is a valid request for service control channel 22b.

For example, the service control channel 22b may be associated with a comfort vehicle operation type and the service control channel 22b may check whether the received vehicle level request 24 is a valid request for a vehicle operation type.

Accordingly, in examples, the method 500 comprises checking, at the service control channel 20, whether the received vehicle level request 24 is a valid request for the service control channel 22.

At block 506 request arbitration on the valid vehicle level requests 24 is performed.

In examples, any suitable method for performing the request arbitration on the valid vehicle level request may be used.

In some examples, the priority of each valid vehicle level request may be determined in the control layer 20 and the highest priority vehicle level request implemented first.

Arbitration may be performed at a plurality of levels. For example, at a first level arbitration may be performed on the basis of the available operation types. For example, emergency motion type may have priority over comfort motion type.

In cases where arbitration cannot be made at the first level, arbitration may be performed at a second level between services of a motion type. For example, hold may have priority over acceleration which may have priority over coast down.

At block 508 one or more control requests 26 are provided to the actuator control layer 16 to control one or more actuators 18 associated with the service control channel 22.

Block 508 is the same as block 404 described in relation to FIG. 4 and therefore block 508 may be as described in relation to FIG. 4.

At block 510 feedback is received from the actuator control layer 16.

In some examples, feedback 28 may be received at the service control channel(s) 22 and/or the return channel 30. Therefore, in examples the method 500 comprises receiving feedback, at the service control channel 22, from the actuator control layer 16.

In examples, any suitable feedback may be received. For example, feedback from one or more actuators 18 and one or more sensors 44 may be received at the control layer 20.

For example, sensor information indicating a rate of deceleration may be fed back to the control layer 20 and/or the vehicle level feature layer 14.

In examples, sensor data from the actuator control layer is received via a return channel 30. In some examples the sensor data is converted into one or more vehicle level measurements in the return channel 30.

The method 500 may therefore comprise receiving feedback, at the control layer 20 and/or vehicle level feature layer 14, from the actuator control layer via a return channel 30 of the control layer 20, distinct from the service control channels 22.

In examples, at least one further control request 26 to one or more associated actuators 18 is provided in dependence upon the received feedback 28.

This is illustrated in the example of FIG. 5 by the line linking block 510 back to block 508.

Therefore, in examples, the method 500 comprises providing at least one further control request 26 to one or more associated actuators 18 in dependence upon the received feedback.

At block 512 one or more service channels 22 are configured in dependence upon a plurality of selectable vehicle operation types.

In examples, configuring a service control channel in dependence upon a plurality of selectable vehicle operation types comprises configuring control requests 26 from the service control channel 22 to the associated actuators 18 in dependence upon the current vehicle operation type for the channel 22.

In examples, the vehicle operation types comprise a plurality of comfort, emergency, lower speed, off-road, semi-autonomous and autonomous.

Figure 6:
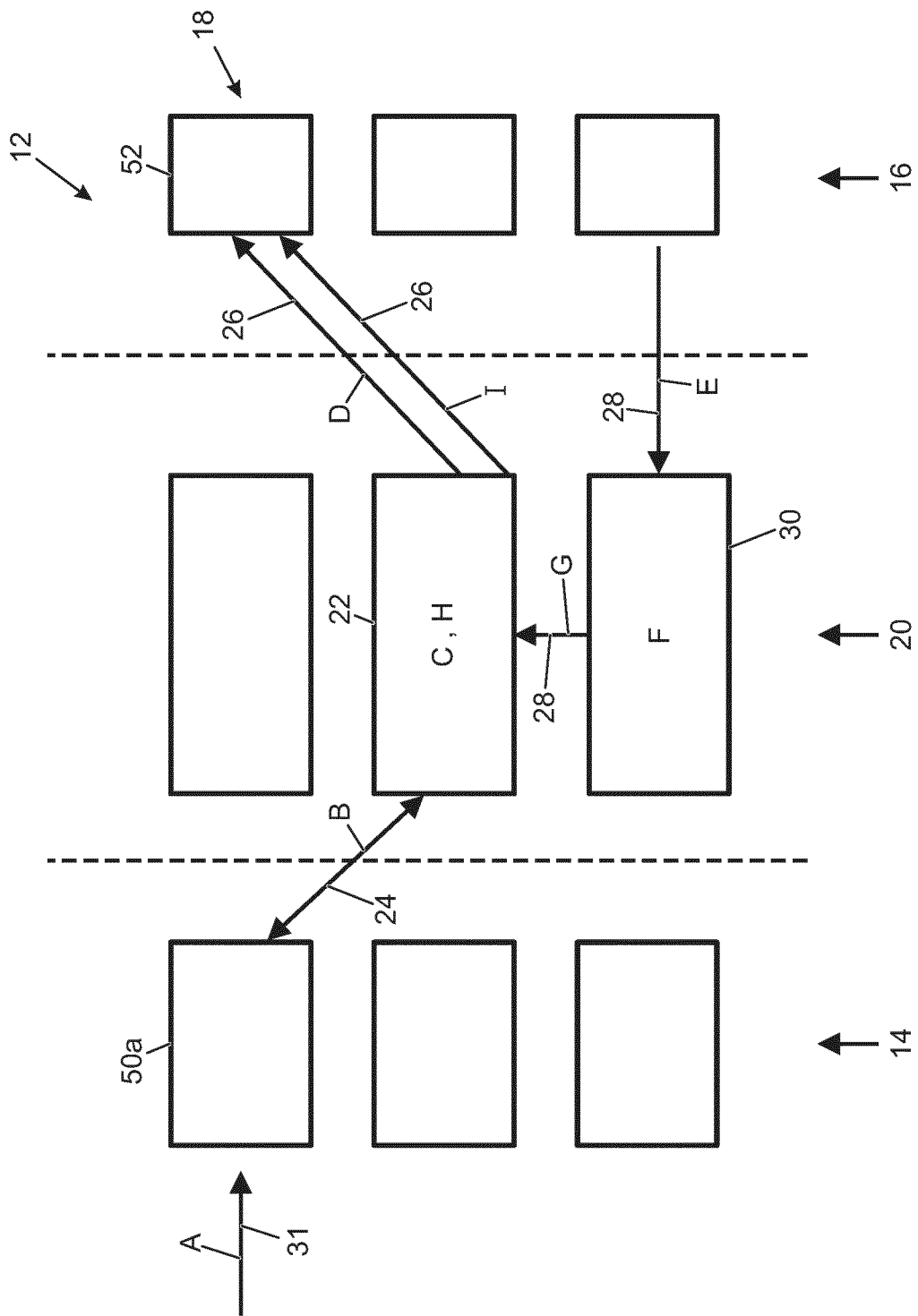
FIG. 6 illustrates an example of operation of a vehicle control multilayer architecture.

FIG. 6 illustrates an example of operation of a vehicle control multilayer architecture 12.

In the example of FIG. 6, the vehicle control multilayer architecture 12 is the vehicle control multilayer architecture 12 described in relation to FIG. 3.

A number of actions A to I are indicated in the example of FIG. 6.

At part A of FIG. 6, data 31 is received at the vehicle level feature layer 14. In the example of FIG. 6 the data 31 is sensor data 31 received from the one or more sensors 44.

A vehicle level feature 50 receives the sensor data 31 and determines that a vehicle level request 24 should be made. In the example of FIG. 6, the sensor data 31 is speed data and the vehicle level feature 50 is a cruise control feature.

The cruise control feature 50 determines from the sensor data 31 that a decrease in the vehicle's speed is required. At part B of FIG. 6 the vehicle level feature 50 issues a vehicle level request 24 to the braking service control channel 22 to request a deceleration of the vehicle 34.

At part C of FIG. 6, the service control channel 22 received the vehicle level request 24 and checks that it is a valid request. In the example of FIG. 6, it is determined that it is a valid request.

Also at part C in FIG. 6, the service control channel 22, as part of the control layer 20, performs arbitration with regard to the request and determines that the vehicle level request 24 is the highest priority request and should be actioned immediately.

The service control channel 22 translates the vehicle level request into an actuator level request 26 and at part D of FIG. 6 issues the actuator level request 26 to the associated actuator control block or module 52 to control one or more braking mechanisms of the vehicle 34.

Also at part D of FIG. 6, the actuator control block or module 52 receives the actuator level request 26 at the actuator control layer 16 and controls the associated actuator(s) 18 to decelerate the vehicle 34.

At part E of FIG. 6, feedback data 28 is received at the return channel 30 from the actuator control layer 16.

In the example of FIG. 6, the feedback data 28 is motion data from one or more sensors 44.

At part F of FIG. 6, the return channel 30 translates the feedback data 28 into a vehicle level measurement of the vehicle's deceleration and/or speed over the ground.

At part G of FIG. 6, the feedback data 28 is provided from the return channel 30 to the service control channel 22 that issued the actuator level request 26 at part D of FIG. 6.

At part H of FIG. 6, the service control channel 22 determines from the feedback data 28 that the vehicle 34 is not decelerating rapidly enough to fulfill the vehicle level request 24 and therefore issues a further actuator level request 26 at part I of FIG. 6.

At part I of FIG. 6, the actuator control block or module 52 receives the further actuator level request 26 and controls the associated actuator(s) 18 to increase the deceleration of the vehicle 34.

More detailed examples of vehicle control multilayer architectures will now be discussed with reference to FIGS. 7 to 9.

Figure 7:
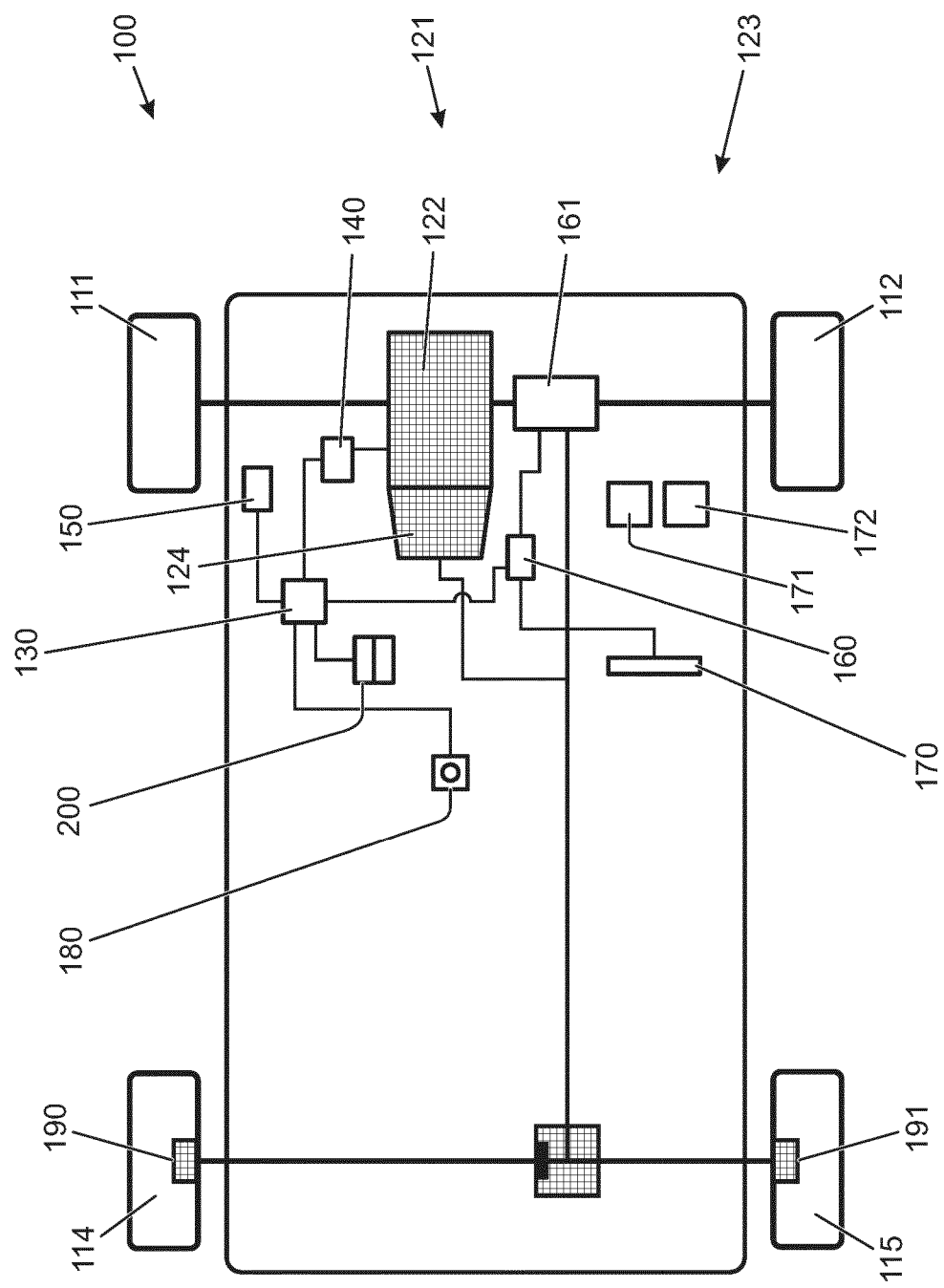
FIG. 7 illustrates a control arrangement of a vehicle.

FIG. 7 is illustrative of the major components of a vehicle control system, in particular longitudinal motion control provided through a brake system and a powertrain, and lateral control through a steering control system. Vehicle 100 has a powertrain 121 that includes an engine 122 that is connected to a driveline 123 having an automatic transmission 124. Torque is transmitted through the driveline 123 to vehicle wheels 111, 112, 114, 115. A control system for the vehicle 100 includes a controller 130 that may, as discussed below, include and be functionally distributed across a plurality of control units. The control system also comprises a powertrain controller 140, which can comprise an engine controller and a transmission controller, a brake controller 150 and a steering controller 160. Steering control 160 may control a power assisted steering unit 161, in this example an electric power assisted steering (EPAS) unit. Each of the controllers 130, 140, 150, 160 comprises one or more electronic processors and a memory device storing computer program instructions, the one or more electronic processors being configured to access the respective memory device and to execute the computer program instructions stored therein to thereby perform the functionality attributed to that controller. Driver controls comprising a steering 170, brake pedal 171 and accelerator pedal 172 provide inputs to the control system, to indicate driver requests for lateral motion or longitudinal motion of the vehicle.

Although the vehicle of FIG. 7 has a powertrain and transmission driven by an internal combustion engine, it will be clear that this is purely by way of example and a vehicle control system embodying the present invention may be implemented on an electric vehicle where drive is provided by electrical motors or motor-generator units, or a hybrid electric vehicle, or a vehicle having any other appropriate powertrain.

It will also be apparent that the driver controls 170, 171 and 172 may comprise mechanically connected controls, or may purely generate electrical signals indicative of the driver request, in particular for brake-by-wire and steer-by-wire systems.

The vehicle 100 may have any appropriate sensors as necessary to provide information on the vehicle state and, if needed, environment. For example, the vehicle 100 has at least one inertial moment unit (IMU) 180 to provide data indicative of vehicle acceleration on the vehicle x, y and z axes, and rotational movement of the vehicle, such as pitch, roll and yaw. Wheel speed sensors, diagrammatically illustrated at 190, 191 provide signals indicative of vehicle speed. Each of the brakes, steering and powertrain will comprise sensors which provide information indicative of their respective states and operating parameters to the respective controllers. The vehicle may also include sensors responsive to the external environment, such as LiDAR sensors, radar sensors, cameras, stereoscopic cameras and ultrasonic sensors. Data may also be received from external data sources. A vision/perception system generally shown at 200 may receive data from the sensors and carry out data fusion and synthesis to provide for example objection identification, road or path identification and vehicle corridor or free space identification.

Figure 8:
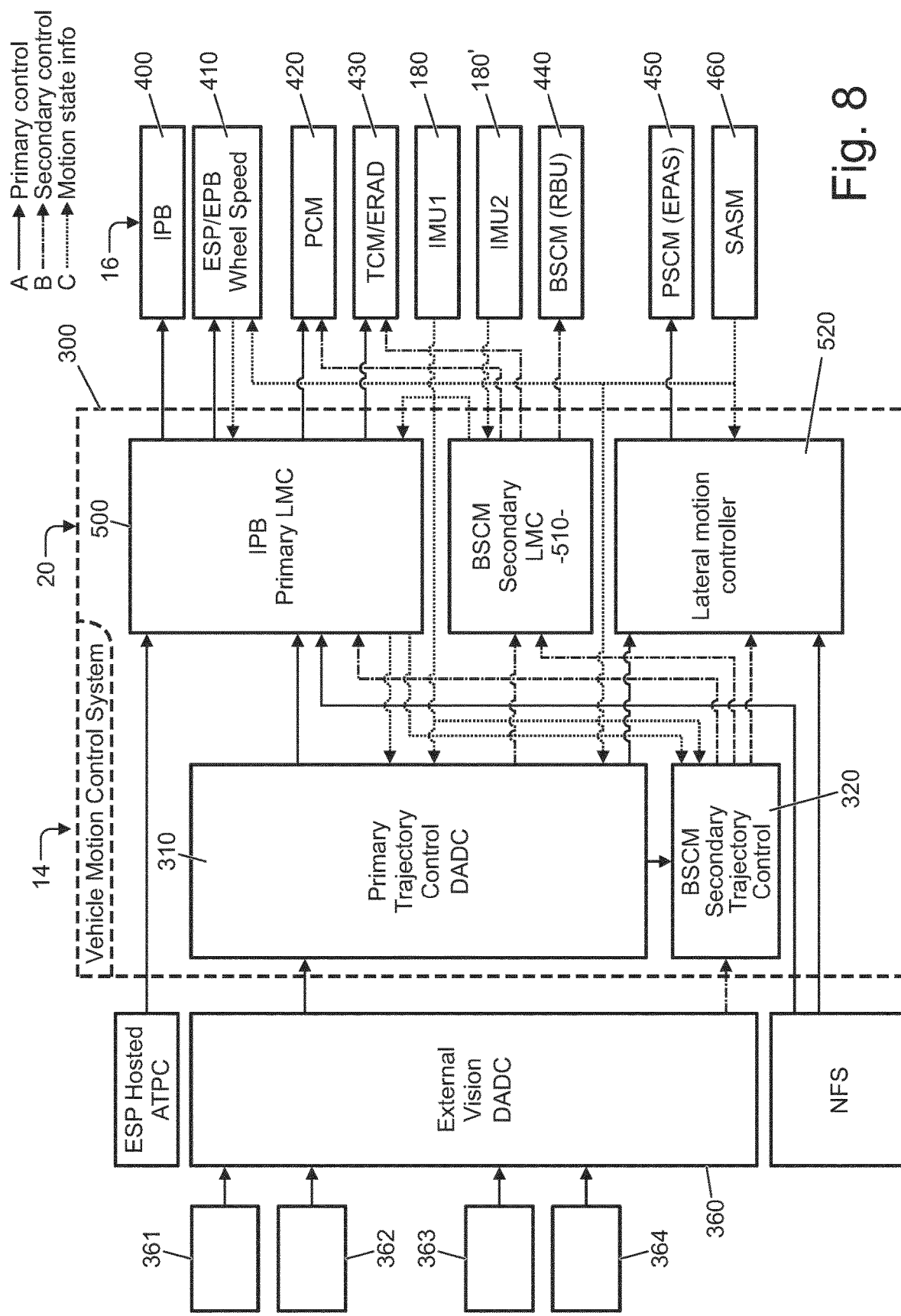
FIG. 8 illustrates a more detailed example of a vehicle control multilayer architecture.

FIG. 8 illustrates an example of a vehicle control system comprising a multilayer architecture. The control system comprises a logical entity referred to as a vehicle motion control system, here generally illustrated at 300. The vehicle motion controllers 300 comprises elements 310, 320 equivalent to the vehicle level feature layer 14, and elements 500, 510, 520, equivalent to the control layer 20. An actuator control layer 16 is in communication with the vehicle motion controllers. In this example, element 310 is a primary trajectory controller and element 320 is a secondary trajectory controller. External vision module 360, similar to the controller 200 of FIG. 7, receives data from sensors 361, 362, 363, 364 and provides dynamic information on the external environment to the primary trajectory controller 310 and secondary trajectory controller 320. The external vision module is responsive to the sensor data, to carry out functions such as object identification classification, road or path identification and navigable space identification, for example by identifying a vehicle corridor or "driving tube", and provide data to the trajectory controllers in a manner to allow the trajectory controllers to provide high-level vehicle control functions.

The primary trajectory controller 310 provides vehicle feature functionality. The features may relate to non-autonomous operation, that is the primary trajectory controller can receive driver inputs which identify required changes to lateral and longitudinal motion of the vehicle, modified in accordance with other parameters or functionality and send requests to the control layer 20. The primary trajectory controller can also be capable of providing vehicle functions in an autonomous operation mode, where little or no driver operation of the drive controls is required, such as Level 3 or Level 4 autonomy.

The actuator layer 16 in this example comprises a primary brake system control module 400, an electronic stability controller 410 which includes wheel speed sensors, a powertrain control module 420, a transmission control module 430, an IMU 180, a secondary IMU 180', a secondary brake system control module 440, a power steering control module 450, and a steering angle sensor module 460 to detect the steering angle. As illustrated by arrows A, B, C, the elements of the actuator layer 16 receive control instructions from, and return motion state information to the elements of the control layer 20 and feature layer 14.

In the control layer 20, the elements shown in FIG. 8 comprise a primary longitudinal motion controller 500, a secondary longitudinal motion controller 510 and a power steering control module 520. Under normal operation the primary longitudinal motion controller 500 and power steering control module 520 provide service functionality equivalent to the service control channels 22 as discussed above, whereby motion type requests from the vehicle feature layer 14 are received and appropriate requests transmitted to the respective actuator in the actuator layer 16. For example, a particular request for a type of longitudinal behavior such as a required acceleration, will be handled by a particular service control channel provided by longitudinal motion controller 510 which for example is configured to provide acceleration in accordance with a required acceleration profile, and generate appropriate instructions to be sent to the transmission control module 430 and powertrain control module 420. The respective element 500, 510, 520 can check to see whether the request for a particular behavior is valid, for example within a defined value range or from a proper source, and also arbitrate between conflicting requests, for example on the basis of a priority rating such as a braking request being assigned a higher priority than an acceleration request.

Although shown as logically separate entities, as discussed above the various components of the control system may be distributed across physical control modules as required. For example, as shown in FIG. 8 the primary trajectory controller 310 and external vision module 360 are provided on the same module, controller 130 of FIG. 7, the power steering controller 520, power steering control module 450, and steering angle sensor module 460 are provided on EPAS controller 160, the powertrain control module 420 and transmission control module 430 are provided on powertrain controller 140, and so on.

Figure 9:
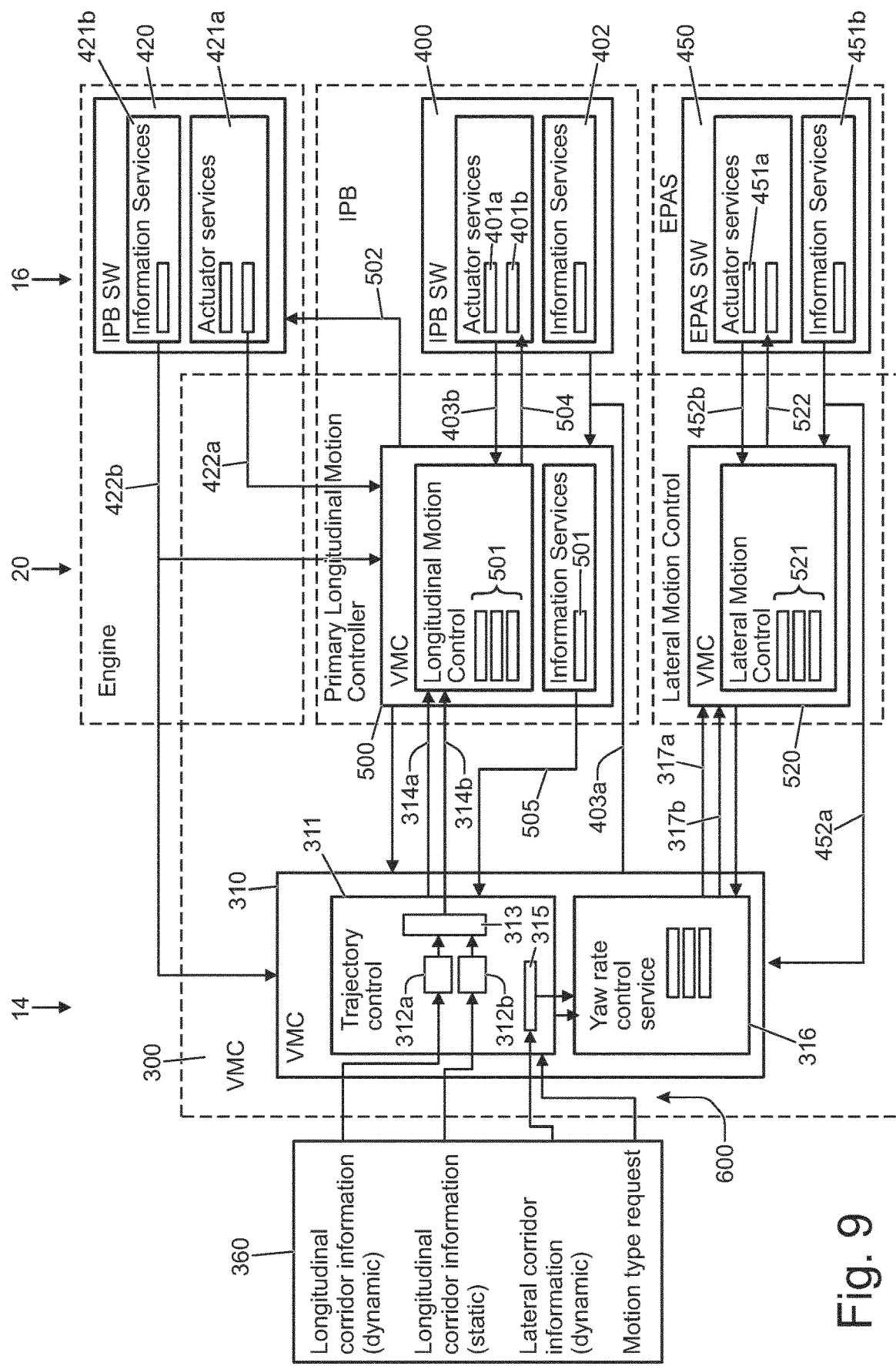
FIG. 9 illustrates a further example of a vehicle control multilayer architecture.

FIG. 9 illustrates a partial view of a vehicle control system which provides functionality for a particular autonomous function to show the provision of services through a multilayer architecture, and to additionally illustrate how logical entities may be provided in a distributed manner.

The vehicle feature provided by the vehicle control system of FIG. 9 is that of autonomous control of the vehicle in a traffic jam situation. The functionality required is to maintain the vehicle within a lane surrounded by moving traffic, and so requires lateral and longitudinal control to steer the vehicle to maintain a desired lane position and travel at an appropriate speed to make progress while maintaining a separation distance between the vehicle 10 and other vehicles or road users.

The external vision module 360 receives data from, for example, cameras and radar sensors, map data, topology and sign data, and determines a longitudinally and laterally extending corridor in which the vehicle 100 may travel. The corridor may be determined from the physical features of the road, and the location, speed and direction of travel of other vehicles. The longitudinal corridor data and lateral corridor data, together with a request for traffic jam operation, is passed to the trajectory controller 310 of the vehicle motion control system 300 as shown by arrows 600. Trajectory control service module 311 of the trajectory controller 310 receives the corridor data as shown at 312a, 312b, and at 313 determines the required motion type and motion service. The required longitudinal motion type and longitudinal motion service are passed to the primary longitudinal motion controller 500 as shown by arrows 314a, 314b. Similarly as shown at 315, the trajectory control service module 311 receives the lateral corridor data and passes a request for a desired lateral motion type and service to a yaw rate control module 316, which determines the required vehicle yaw and service type to the lateral motion controller 520 as shown by arrows 317a, 317b.

The requests shown by arrows 314a, 314b, 317a, 317b are relatively high-level in that they indicate a desired motion of the vehicle. The primary longitudinal motion controller 500 and lateral motion controller 520 each provide a plurality of services illustrated at 501, 521. The primary longitudinal motion controller services 501, in response to a request, generate instructions to be sent to the powertrain control module 420, which can be instructions for a given value of torque, as shown by arrow 502. The primary longitudinal motion controller services 501, in response to the request, can also generate instructions to be sent to the brake control module 400 for a required brake force, as shown by arrow 503. The primary longitudinal motion controller services 501 are configured to provide particular functionality, such as, in response to an acceleration or braking request, generate instructions to be sent to the powertrain control module or brake control module to vary the torque or brake force such that the vehicle accelerates or decelerates with a desired acceleration profile or wheel torque, optionally in response to a driver input or a detected terrain type.

Similarly, the lateral motion controller services 521, in response to a request, generate instructions to be sent to the EPAS module 450 as shown by arrow 522, which can be instructions for a given value of steering torque or wheel angle as appropriate.

The primary motion control module 500 additionally has an information service 504, which provides vehicle state information to the trajectory controller 310 as shown by arrow 505 for use in determining required longitudinal and lateral motion.

From FIG. 9, it will also be apparent that the actuator controllers in the actuator layer 16 can be configured to provide services. The brake control module 400 in this example provides a brake force service 401*a* and a brake hold service 401*b*, while the powertrain control module 420 provides an engine torque service 421*a*. Additionally, the actuator controllers can, through additional services, provide state information, as shown by arrow 422*a*, and driver intention information to modules in the feature layer 14 and control layer 20. Thus, the powertrain control module 420 comprises service 421*b* which transmits driver intention information as shown by arrow 422*b*. The driver intention information can for example be received from a position sensor detecting actuation of the accelerator.

Brake control module 400 comprises service 402, which transmits driver intention information and wheel speed information, as shown by arrows 403*a*, 403*b*. The driver intention information can similarly for example be received from a position sensor detecting actuation of the brake pedal. The steering control module 450 comprises services 451*a*, 451*b*, where service 451*a* translates a requested steering angle or steering torque into a rack position. Service 451*b* transmits driver intention information as shown by arrow 452*a*, for example be received from a steering angle sensor module 460 detecting operation of the steering wheel.

In addition, each of the actuator controllers transmits service state information indicating the service state, such as the availability, current operating state, or capacity of the respective actuator or services, as shown by arrows 403*b*, 422*a*, 452*b*.

FIG. 9 additionally shows how the vehicle motion controller 300 comprises logically elements which may be implemented on separate physical components, and grouped with other modules. Thus, the primary longitudinal motion controller 500 is provided as part of the brake controller 150 and with the brake control module 400, and the lateral motion controller 520 and EPAS control module 450 are provided on the EPAS controller 160.

Hence, the control system described herein permits a a high-level vehicle feature (autonomous operation in a traffic jam in the particular example of FIG. 9) can be implemented in the feature layer 14 in a way that is functionally separated from the actuator layer 16. The control layer 20 can receive high-level requests for vehicle motion from the feature layer 14, irrespective of the function or location of the feature that is generating those requests, and generate instructions for controlling the actuator layer 16 which may be modulated in dependence on discrete functionality provided in the control layer 20. Thus additional features may be added by providing an appropriate module or element in the feature layer 14 which is operable to perform its own internal determination of required behavior and pass instructions to the control layer 20, independent of any other features in the feature layer 14 or particular details of the actuators or actuator layer 16. Similarly, the actuators of the actuator layer 16 can be varied, without affecting the feature layer 14; it is only necessary to provide the appropriate services or service channels in the actuator layer to map the requests from the control layer to the different actuator.

In addition, the feature layer 14 is advantageously loosely coupled to a vision/perception system, such as the external vision module 360. The VMC receives data from the vision/perception system relating to the navigable environment around the vehicle 100. in effect identifying the space within which the vehicle may move and potential obstacles or hazards, and the VMC is able to act on the received data. However, the vision/perception system does not transmit requests for motion to the VMC (which would represent a tight coupling). By having the VMC loosely coupled to the vision/perception system, it will be apparent that the VMC, and in particular the feature layer 14, is independent of the vision/perception system and thus of the specific suite of sensors and data analysis performed in the vision/perception system. Because of the independence of the feature layer from both the actuator layer and the sensor suite, a feature can be readily used in different vehicles regardless of the particular vehicle variant.

Although the examples above show a vehicle with driver controls and show operation in a Level 3 autonomous mode, it will be clear to the skilled reader that a vehicle control system in accordance with the present invention may be used in a vehicle capable of operation in any suitable level of autonomy including Level 4, or in Level 5 autonomous operation where driver controls are substantially never used or are not provided on the vehicle.

Figure 10:
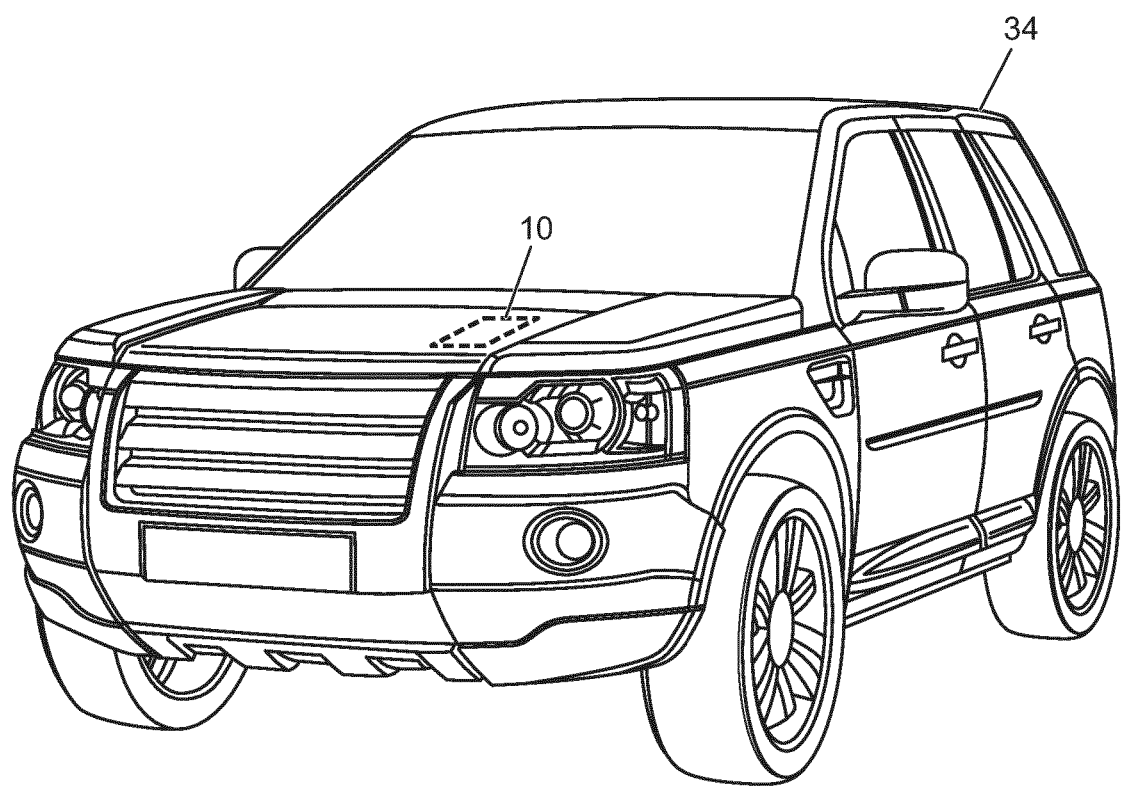
FIG. 10 illustrates an example of a vehicle.

FIG. 10 illustrates an example of a vehicle 34. In the illustrated example, the vehicle 34 comprises a vehicle control system 10 as described in relation to FIG. 1 and a vehicle system 32 as described in relation to FIG. 2.

As used herein "for" should be considered to also include "configured or arranged to". For example, a "vehicle control system for" should be considered to also include "a control system configured or arranged to".

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The examples of the disclosure provide technical benefits.

For example, the provision of the distinct service control channels 22 in the vehicle control multilayer architecture 12 allows for easy adaptation of the architecture 12. For example, the addition and/or removal and/or modification of one or more features 50 and/or one or more actuators 18 can easily be implemented.

Furthermore, the service control channels 22 can be configured to implement safety protocols and therefore modification of the features 50 and/or actuators 18 will not affect safety protocols of the architecture 12 and therefore vehicle 34 as long as after any modification the safety contracts of the service control channel are still satisfied.

Moreover, each vehicle operation type may represent a specific context for the safety characterised by its boundary limits of control.

Also, each service control channel 22 represents a specific safety capability per vehicle operation type that can be matched with the requesting vehicle level feature safety requirement.

Also, each service control channel 22 may represent a specific safety capability or safety case per vehicle operation type that can be matched with the requesting vehicle level feature safety requirement or safety case.

As used here 'module' refers to a unit or apparatus that excludes certain parts/components that would be added by an end manufacturer or a user.

The blocks illustrated in the FIGS. 4 and 5 may represent steps in a method and/or sections of code in the computer program 36. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A vehicle control system for a host vehicle, the vehicle control system comprising one or more controllers, the one or more controllers being configured to provide:
    a vehicle level feature layer;
    an actuator control layer configured to control a plurality of actuators; and
    a control layer isolating the vehicle level feature layer and the actuator control layer from each other, the control layer comprising a plurality of distinct service control channels, wherein:
        each of the plurality of distinct service control channels is associated with a vehicle operation;
        each service control channel is configured to translate vehicle level requests from the vehicle level feature layer to actuator level requests, wherein one or more actuators are assigned to the operation associated with each respective service control channel; and
        each service control channel is configured to receive vehicle level control requests from one or more vehicle level features and to provide control requests to the actuator control layer to control one or more associated actuators in response to a received vehicle level control request, wherein the control layer comprises a return channel, distinct from the service control channels, and configured to provide feedback from the actuator control layer to at least one of the control layer and the vehicle level feature layer.

2. The vehicle control system of claim 1 wherein the one or more controllers collectively comprise:
    at least one electronic processor having an electrical input for receiving signals and
    at least one electronic memory device electrically coupled to the at least one electronic processor and having instructions stored therein;
    and wherein the at least one electronic processor is configured to access the at least one memory device and execute the instructions thereon.

3. The vehicle control system as claimed in claim 1, wherein one or more of the distinct service control channels is configured to receive feedback from the actuator control layer, and wherein the one or more distinct service control channels configured to receive feedback from the actuator control layer is configured to provide at least one further control request to one or more associated actuators in dependence upon the received feedback.

4. The vehicle control system as claimed in claim 1, wherein the return channel is configured to convert sensor data from the actuator control layer into one or more vehicle level measurements.

5. The vehicle control system as claimed in claim 1, wherein one or more of the plurality of service control channels is configurable in dependence upon a plurality of selectable vehicle operation types wherein configuring a service control channel in dependence upon a plurality of selectable vehicle operation types comprises configuring control requests from the service control channel to the associated actuators in dependence upon the current vehicle operation type for the channel.

6. The vehicle control system as claimed in claim 1, wherein the control layer comprises a plurality of service control channels associated with a same vehicle operation but each associated with a different vehicle operation type.

7. The vehicle control system as claimed in claim 5, wherein the vehicle operation types comprise a plurality of comfort, emergency, low speed, off road, semi-autonomous and autonomous.

8. The vehicle control system as claimed in claim 1, wherein each service control channel is configured to check whether received vehicle level requests are valid requests for the service control channel, and wherein the control layer is configured to perform request arbitration on the valid vehicle level requests.

9. The vehicle control system as claimed in claim 1, wherein the service control channels are configured to implement one or more safety protocols.

10. A method of controlling a host vehicle, the method comprising:
receiving, at a service control channel associated with a vehicle operation, a vehicle level request from a vehicle level feature layer, wherein the service control channel is one of a plurality of distinct service control channels, and wherein a control layer comprises the plurality of distinct service control channels and isolates the vehicle level feature layer and an actuator control layer from each other;
translating, at the service control channel, the vehicle level request to an actuator level request; and
providing the actuator level request to the actuator control layer to control one or more actuators associated with the service control channel and assigned to the vehicle operation associated with the service control channel, and receiving feedback, at the control layer and/or the vehicle level feature layer, from the actuator control layer via a return channel of the control layer, distinct from the service control channels.

11. The method as claimed in claim 10, further comprising receiving feedback, at the service control channel, from the actuator control layer.

12. The method as claimed in claim 11, further comprising providing at least one further control request to one or more associated actuators in dependence upon the received feedback.

13. The method as claimed in claim 10, further comprising converting, at the return channel, sensor data from the actuator control layer into one or more vehicle level measurements.

14. The method as claimed in claim 10, further comprising configuring one or more of the plurality of service channels in dependence upon a plurality of selectable vehicle operation types.

15. The method as claimed in claim 14, wherein configuring a service control channel in dependence upon a plurality of selectable vehicle operation types comprises configuring control requests from the service control channel to the associated actuators in dependence upon a current vehicle operation type for the channel.

16. The method as claimed in claim 10, further comprising checking, at the service control channel, whether the received vehicle level request is a valid request for the service control channel.

17. A vehicle comprising the vehicle control system as claimed in claim 1.

18. A non-transitory computer-readable medium having stored thereon a computer program comprising instructions that, when executed by one or more processors of one or more controllers of a vehicle control system, cause the vehicle control system to perform at least:
receiving, at a service control channel associated with a vehicle operation, a vehicle level request from a vehicle level feature layer, wherein the service control channel is one of a plurality of distinct service control channels, and wherein a control layer comprises the plurality of distinct service control channels and isolates the vehicle level feature layer and an actuator control layer from each other;
translating, at the service control channel, the vehicle level request to an actuator level request; and
providing the actuator level request to the actuator control layer to control one or more actuators associated with the service control channel and assigned to the vehicle operation associated with the service control channel, and receiving feedback, at the control layer and/or the vehicle level feature layer, from the actuator control layer via a return channel of the control layer, distinct from the service control channels.

\* \* \* \* \*